United States Patent Office 3,340,619
Patented Sept. 12, 1967

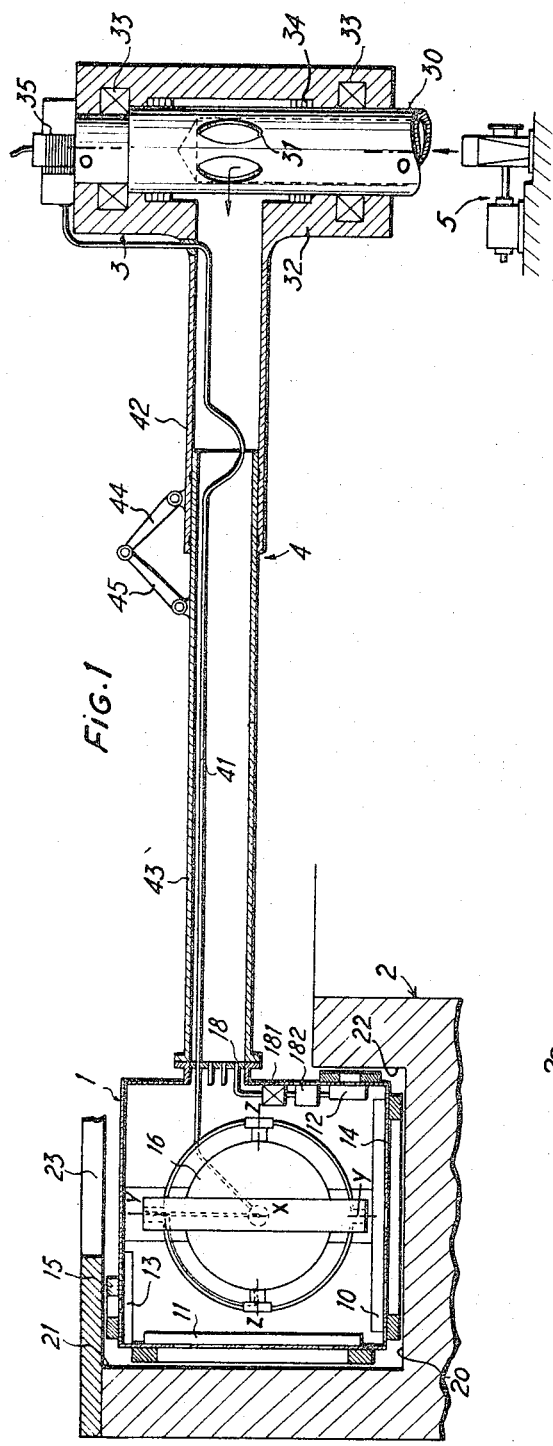
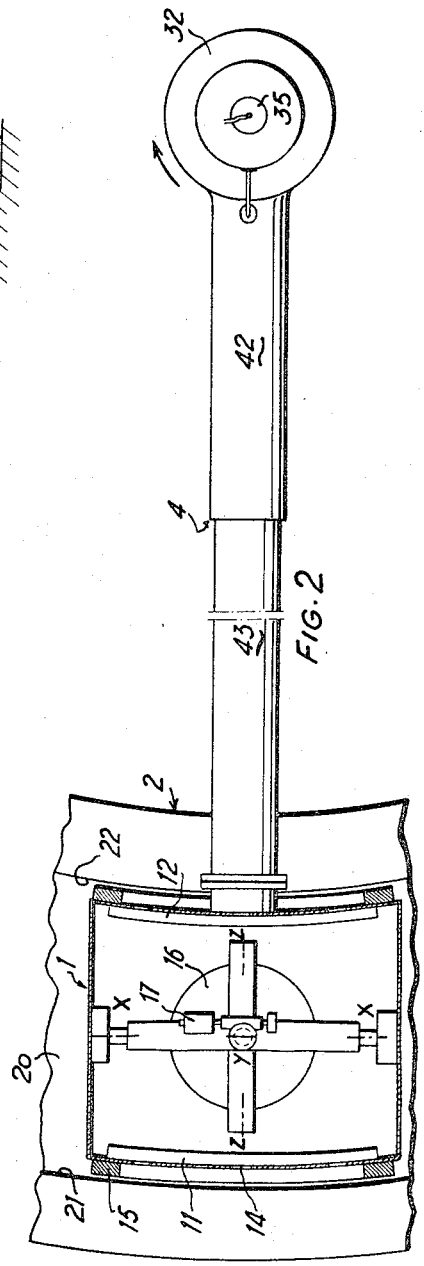

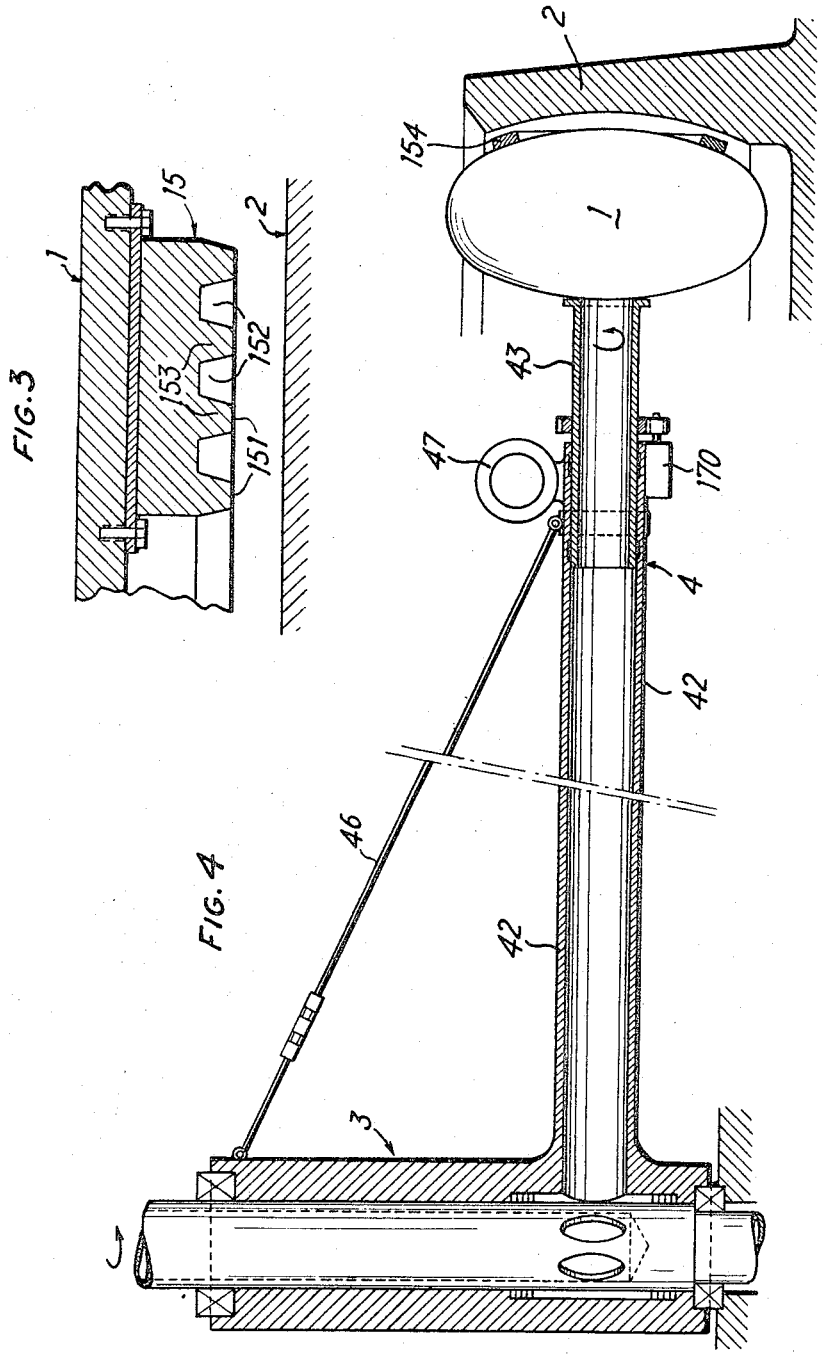

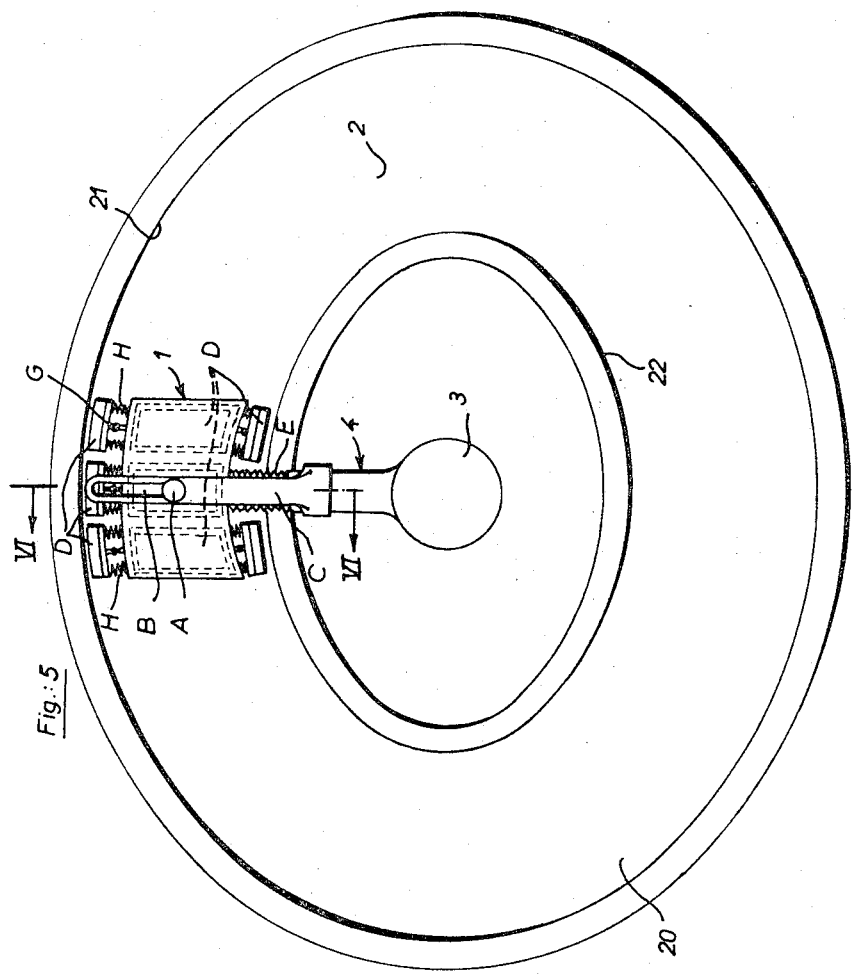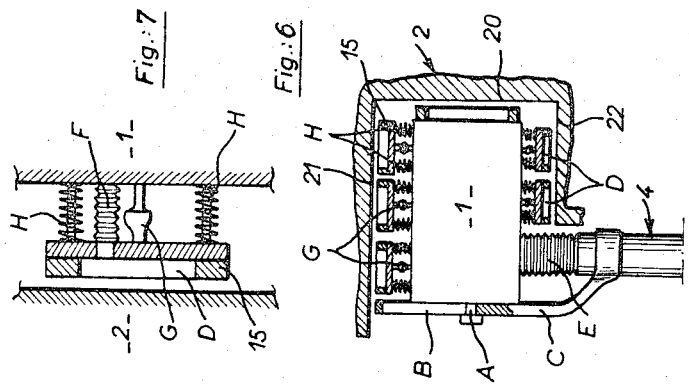

3,340,619
TEST APPARATUS FOR APPLYING ACCELERATIONS, MORE PARTICULARLY TO PILOTS
Jean Henri Bertin, Neuilly-sur-Seine, France, assignor to Bertin & Cie, Paris, France, a company of France
Filed Sept. 3, 1965, Ser. No. 484,993
Claims priority, application France, Sept. 8, 1964, 987,428
23 Claims. (Cl. 35—12)

ABSTRACT OF THE DISCLOSURE

A centrifuge simulator or like test apparatus having a frame or nacelle connected to a central shaft through a revolving arm and radially guided along a closed curve endless trackway with the interposition of a pressure fluid cushion formed between said frame and said trackway.

---

This invention relates to apparatus, of the kind commonly known as centrifuges, for applying predetermined and possibly considerable accelerations to different kinds of equipment, to living beings and inter alia to pilots.

Basically, the conventional centrifuges of this kind comprise a rotating arm mounted on a vertical-axis hub and have provision for applying driving and braking torques to the hub. The arm must withstand radial stresses due to the inertia of a laboratory nacelle which is mounted at the arm end and which can have several degrees of freedom of movement. The bearings must also be able to transmit the stresses unless a counterweight is provided at the other end of the arm, in which event the moment of inertia of the whole system is increased with a consequent reduction in possible accelerations. The arm must be very rigid if it is to withstand the high bending moments produced by nacelle weight and more particularly if it is to withstand the tangential inertia forces acting on the nacelle when the same is accelerated or braked.

According to the present invention there is provided a test apparatus comprising a nacelle movable along a predetermined path, in which the nacelle is guided in operation at least radially by at least one pressure fluid cushion on a track having the shape of a closed curve.

The nacelle may be mounted upon a telescopic arm whose main function is to provide connections between the nacelle, the control and recording station and the pressure fluid supply unit. The arm does not have to withstand radial stresses. Instead of a telescopic arm being used, a connection permitting radial movement of the nacelle relatively to the arm can be provided between the arm and the nacelle.

In a first form of the invention, the nacelle is guided radially and vertically by gas cushions. As a variant, nacelle weight is borne by the rotating arm and the track serves merely to provide radial guidance, in which event the track can be a spherical ring and the nacelle can be a body of revolution around the arm axis and can be pivotally mounted at the arm end.

A non-circular track, for instnace, an elliptical track, has the advantage over a circular track that the nacelle experiences radial accelerations as the arm rotates, so that the range of tests which the apparatus can make is increased. In this case, the nacelle is coupled with the rotating arm by way of a journal or pivot pin or similar projecting element on the nacelle, such element being engaged in a longitudinal guiding slot in the rotating arm, slot length being at least equal to the difference between the maximum and minimum vector radii of the nacelle path. Of course, the relative arrangement of the coupling elements can be reversed, the journal or the like being disposed on the rotating arm and the nacelle being formed with the guiding slot. The journal can receive an anti-friction bearing which runs in the guiding slot. Advantageously, the journal or the like is in shape cylindrical and is disposed substantially vertically. Preferably, the journal axis passes through the nacelle's centre of gravity.

With such a non-rigid connection between the rotating arm and the nacelle, it is advisable, if not imperative, to guide the nacelle on the track by means of a number of independently supplied pressure fluid cushions if the nacelle is to be guided with satisfactory stability, in the light of the disclosures made by French Patent No. 1,310,483 of Jan. 17, 1961. Another advantage of co-operation between a number of cushions and the non-circular guiding surfaces with vertical generatrices is that severe fluid leakage is avoided at those parts of such surfaces which have the smallest radius of curvature; also, a number of cushions providing support at least in the direction of the movement reduces and may possibly even obviate the pitching torque which the particular kind of coupling concerned may produce.

In order that the present invention may be well understood, there will now be described certain preferred embodiments thereof, given by way of example, with reference to the accompanying drawings, in which:

FIGURE 1 is a diagrammatic radial section through the moving part of an apparatus according to the invention;

FIGURE 2 is a partly-sectioned plan view corresponding to FIGURE 1;

FIGURE 3 is a section showing the construction of a seal;

FIGURE 4 is a radial section through a variant of the apparatus;

FIGURE 5 is a diagrammatic plan view showing an embodiment of an apparatus having an elliptical track;

FIGURE 6 is a section on the line VI—VI of FIGURE 5, and

FIGURE 7 is a partial section to an enlarged scale showing one of the fluid cushions or pads or the like shown in FIGURE 6.

Throughout the drawings, the general reference 1 denotes the nacelle, 2 denotes the circular track, 3 denotes the hub, and 4 denotes the arm connecting the nacelle to the hub.

Preferably, and as can be seen in FIGURES 1 and 2, the track 2 has a horizontal bottom surface 20, a concave cylindrical surface 21 and at least one convex cylindrical surface element 22 whose radius is less than the radius of the surface 21. If requried, the track can have at the top a top horizontal edge 23 which is removable at least locally for positioning of the nacelle 1. The track can be of conventional construction using metal or reinforced concrete constructional material. If reinforced concrete is used, the cylindrical surfaces can be given final trueing by a grinder mounted on an auxiliary arm centered on the tube 3.

In the embodiment shown in FIGURES 1–3, the arm 4 connecting the nacelle 1 to the hub 3 is a telescopic tube whose cross-section can, if required, be specially shaped and whose main function is to supply the nacelle with the guiding and propulsive fluid and to receive the various passages or the like required to control the nacelle and to record the parameters which the apparatus can measure. The two parts 42, 43 of the arm 4, whose provision for relative radial movement is slight, can be interconnected by conventional sliding-contact type bearing surfaces and gaskets. Advantageously, struts 44, 45 or the like are provided to prevent relative rotation between the parts 42 and 43. The part 42 can have limited provision for pivoting, relatively to the hub 3, around a horizontal axis, corresponding to variations of the distance between the nacelle 1 and the track bottom surface 20.

Preferably, the nacelle 1 is rectangular in radial cross-section (FIGURE 1). Its shape in plan (FIGURE 2) may differ from the shape of the nacelle-bearing gas cushions and the nacelle 1 can have front and rear fairings to reduce drag. The nacelle 1 has, on surface portions disposed opposite the track, chambers 10–13 for pressure equalisation of a fluid supplied via the arm 4. As shown for the chamber 12, the fluid goes to the chambers 10–13 through ducts 18 having solenoid control valves 181, flows through the surface portions just mentioned by way of orifices 14, and has leaks at the periphery of the surfaces reduced by gaskets 15, an embodiment of which is shown in FIGURE 3.

These gaskets or seals 15 are of the labyrinth kind and have a number of lips 153 separated from one another by chambers 152 where the speed of the leakage flow is reduced. The gaskets 153 are made of an abrasion- and heat-resistant material, such as is used for brake linings, at least opposite that surface of the track 2 which is used to brake the nacelle 1, and the gaskets have a relatively large contact surface 151. The gaskets 15 can be made of rubber or the like opposite the track surfaces with which they make contact only accidentally.

The nacelle 1 can in known manner include a gimbal-mounted test chamber or cockpit 16 having, as required, means enabling it to be rotated and/or displaced around one or more axes XX, YY and ZZ; such means can take the form, for instance, of an electric motor 17 which is mounted on a frame of the gimbal suspension and which drives another frame through a worm gear and worm wheel. The fluid supplied through the arm can be used to impart composite accelerations to the nacelle, by operating motors and turbines and jacks or rams or by acting just as simple modulated streams.

The fluid can be a liquid or gas and is, with advantage, air. It is compressed by a motor compressor set 5 or the like and goes to the arm 4 through the hub 3. The same has, for instance, a stationary part 30 nearest its axis and in the form of a hollow shaft formed at arm level with radial orifices 31, the hub 3 also comprising a moving part 32 rigidly connected to the arm part 42. Bearings 33, for instance, anti-friction bearings, and seals or gaskets 34, for instance, of the labyrinth kind, interconnect the hub portions 30, 32. The passages 41 which extend to the nacelle 1 go from the hub 3 to the arm 4 by a multiple rotating gasket 35.

Each surface of the nacelle preferably co-operates with the track and with the gaskets 15 to bound a number of independently supplied cushions, to prevent the nacelle from oscillating around its centre of gravity. If the particular fluid used is a liquid, the various cushions can each be supplied via a flow controller 182 interposed between the arm part 43 and the or each corresponding chamber 10–13. If the fluid is a gas, the flow controllers can, if need be, be replaced by nozzles calculated to operate just below the speed of sound when the corresponding gasket is at its normal distance from the associated track surface. In the event of a sudden increase in leakage, a nozzle of this kind becomes sonic so that its delivery is limited independently of the pressure downstream. If the leakages through the gaskets 15 before and behind the nacelles are unequal, a reactive propulsive force is applied to the nacelle. Of course, different propulsive nozzles and even special reaction engines such as rockets can be provided.

The apparatus operates as follows:

The motor compressor set 5 is started and the or each cushion disposed between the nacelle and the plane surfaces 20, 23 of the track is supplied consecutively, then the cushions between the cylindrical surfaces 21, 22 and the nacelle are supplied, and finally, where applicable, the propulsive engines or nozzles are supplied. The nacelle accelerates on the track; its speed can subsequently be stabilised while the cockpit is displaced about its three axes. Because of the very high radial accelerations $V^2/R$, considerable tangential braking accelerations can readily be applied to the nacelle. To this end, the fluid supplied to the guiding cushions disposed opposite the concave surface 21 of the track is reduced, preferably until the gaskets 15 develop the required braking force.

In the variant shown in FIGURE 4, the arm 4 bears the weight of the nacelle conventionally and can be strengthened accordingly by a bracing strut 46 bracing the arm part 42 near the hub 3. The track 2 in shape resembles a spherical ring coaxial of the hub 3. The nacelle 1 is streamlined to reduce drag and is, with advantage, a body of revolution around the arm axis. On the side remote from the track 2, the nacelle 1 has at least one circular packing or the like 4 which bounds, preferably in cooperation with other gaskets, a number of air cushions and which can be used for braking. The arm part 43 near the nacelle 1 is rigidly connected thereto and can be rotated relatively to the arm part 42 by an electric motor 170. Inside the nacelle the cockpit is gimbal-mounted on two axes to give complete freedom of revolution. A turbo-jet or some other jet propulsive unit 47 can be disposed at that end of the arm part 42 which is remote from the hub 3, to rotate the nacelle around the hub axis. If required, propulsive nozzles to which compressed air is supplied through the arm 4 can be used. In this form of the invention, braking can be provided by the gaskets or the like 15 rubbing on the track 2 or by reversal of the thrust of the device 47.

In the variant shown in FIGURES 5 to 7, the track is not circular in plan but has any other desired closed shape. By way of example, an elliptical or oval shape is shown in FIGURE 1. The connection between the rotating arm 4 and the nacelle 1 is provided by means of a vertical cylindrical pivot pin or journal or the like A which can have an antifriction bearing around it and which projects above the nacelle 1 and which engages in a radial guide slot B in an extension C of the arm 4. The slot B is in length at least equal to the eccentricity of the track 2. Co-operating with each guiding surface of the track 2 are a number of fluid cushions D which are associated with appropriate gaskets 15 and which are supplied with pressure fluid independently of one another; the pressure fluid can be supplied from the hub 3 and hollow arm 4 via bellows E which protect the various ducts, second bellows F being provided for each cushion D. Advantageously, the cushions are swivel-mounted, as indicated by the reference G, in order to be able to be tilted variably relatively to the nacelle 1, and are returned by a number of guide springs H; for instance, four such guide springs H can be provided for each cushion or pad or the like D. By way of example and to give some idea, three pads can be used on the horizontal surface 20 to provide lift and reduce or obviate the pitching torque possibly caused by the non-rigid connection A, B; advantageously, more cushions are used on the non-cylindrical curved surfaces to prevent excessive leaks in the regions having the lowest radius of curvature. For instance, six cushions can be provided on the inside surface 22 and 9 cushions can be provided on the outside surface 21.

Of course, the embodiments described are only examples and can be modified, inter alia by the substitution of equivalent technical means, without for that reason departing from the scope of the invention. More particularly, the telescopic arms shown in FIGURES 1, 2 and 4 can be replaced by an articulated or just flexible arm, or else the arm can, if required be omitted if appropriate sliding or rolling connections are provided along the track for the various ducts to the nacelle; the stationary part of the hub can be disposed outside the moving part; the nacelle can be driven either conventionally via the hub and arm or by a linear motor extending all the way round the periphery of the track (the latter motor being electric or of the turbo kind), the linear motor also being usable for braking. The gaskets disposed opposite the bottom plane surface of the track can also help to brake the nacelle; however, the retarding force which the latter gaskets can develop is substantially constant and has an upper limit imposed by gravity.

What is claimed is:

1. A test apparatus for the centrifuge type producing predetermined accelerations and comprising: an endless trackway defining a closed curve path and having at least one guiding surface which faces inwardly of said path and extends generally breadthwise substantially perpendicularly to the radius vector of said closed curve path; a frame designed for orbiting along said closed curve path on the inside of said trackway and having an outwardly facing side positioned adjacent to but radially spaced from said inwardly facing guiding surface; wall means projecting from said frame side toward said guiding surface for laterally bounding at least one fluid cushion space therebetween; means supplying pressure fluid to said space to maintain a pressure fluid cushion therein; a shaft positioned inwardly of said path and at a distance therefrom; and, mechanical connecting means extending from said shaft to said frame and revolving about said shaft substantially perpendicularly to said guiding surface.

2. Apparatus as claimed in claim 1, wherein said guiding surface is of generally cylindrical concave form with substantially vertical generatrices and said closed curve path extends substantially in a horizontal plane.

3. Apparatus as claimed in claim 2, wherein said endless trackway further comprises at least one annular, vertically facing, additional guiding surface extending inwardly from said cylindrical guiding surface and substantially in a horizontal plane, and wherein said frame further comprises at least one vertically facing side adjacent to but spaced from said additional guiding surface, and fluid cushion means formed between said vertically facing side and said additional guiding surface.

4. Apparatus as claimed in claim 3, wherein said endless trackway comprises two opposite annular additional guiding surfaces extending inwardly from said cylindrical guiding surface and substantially in horizontal planes and respectively facing upwardly and downwardly, and wherein said frame comprises a downwardly facing side adjacent to but spaced from said upwardly facing surface and an upwardly facing side adjacent to and spaced from said downwardly facing surface, and fluid cushion means formed between each of said opposite additional guiding surfaces and the respective side of said frame.

5. Apparatus as claimed in claim 4, wherein said endless trackway further comprises an outwardly facing, complementary guiding surface of generally cylindrical convex form extending opposite to and inwardly of said generally cylindrical concave guiding surface, and wherein said frame further comprises an inwardly facing side adjacent to but spaced from said outwardly facing convex surface and fluid cushion means formed between said inwardly facing side and said outwardly facing surface.

6. Apparatus as claimed in claim 1, wherein said mechanical connecting means comprises an arm of variable length extending generally radially between said shaft and said frame.

7. Apparatus as claimed in claim 6, wherein said closed curve path is of generally oval shape and said shaft is located at a substantially central position with respect to said path.

8. Apparatus as claimed in claim 1, wherein said frame comprises a support carrying said wall means and connected to said mechanical connecting means, and a cockpit gimballed on said support for universal rotation relatively thereto.

9. Apparatus as claimed in claim 8, further comprising means on said cockpit for controlling the angular movement thereof with respect to said support.

10. Apparatus as claimed in claim 1, wherein said fluid pressure supply means comprise duct means extending in said mechanical connecting means.

11. Apparatus as claimed in claim 10, wherein said shaft is hollow and said fluid pressure supply means further comprise a pressure fluid source discharging into said hollow shaft.

12. Apparatus as claimed in claim 1, wherein said wall means comprise a free end adjacent to said trackway and designed to constitute therewith a labyrinth seal for said fluid cushion when said end is spaced from said trackway and a brake member for said frame when said end engages said trackway.

13. Apparatus as claimed in claim 1, wherein said guiding surface is shaped to be part spherical and has a substantially horizontal means equatorial plane and said closed curve path extends substantially in said plane.

14. Apparatus as claimed in claim 13, wherein said frame is of revolution shape about a radial axis contained in said plane.

15. Apparatus as claimed in claim 1, wherein said frame is rotatably mounted with respect to said connecting means, said apparatus further comprising means for controlling rotation of said frame relatively to said connecting means.

16. Apparatus as claimed in claim 1, further comprising jet propulsion means fitted on said mechanical connecting means to drive the same in its revolution about said shaft.

17. Apparatus as claimed in claim 1, wherein said wall means is movably fitted with respect to said frame, said apparatus further comprising resilient means extending between said frame and said wall means.

18. Apparatus as claimed in claim 17, wherein said wall means is pivotally mounted on said frame and said resilient means urges said wall means into a mean angular position relatively to said frame.

19. Apparatus as claimed in claim 17, wherein said fluid pressure supply means comprise a deformable bellows duct extending from said frame and opening into said fluid cushion space.

20. Apparatus as claimed in claim 1, wherein said closed curve path is of non-circular shape and is defined by the revolution about said shaft of a radius vector which gradually varies in length between a minimum value and a maximum value, and said mechanical connecting means comprise a radial guide slot having a length at least equal to the range of variation in length of said radius vector and a pin freely engaging said radial slot for guided displacement therealong.

21. Apparatus as claimed in claim 20, wherein said mechanical connecting means further comprise a frictionless bearing fitted on said pin.

22. Apparatus as claimed in claim 20, wherein said pin is fitted on said frame on an axis passing substantially through the center of gravity of said frame.

23. Apparatus as claimed in claim 5, wherein the fluid cushion means are subdivided into a plurality of separate and distinct, independently supplied, elemental fluid cushions, the number of elemental fluid cushions formed on said generally cylindrical guiding surfaces being greater than the number of elemental fluid cushions formed on said substantially horizontal planar guiding surfaces.

References Cited

UNITED STATES PATENTS

| | | | |
|---|---|---|---|
| 3,041,741 | 7/1962 | Barker | 35—12 |
| 3,108,546 | 10/1963 | Hafner | 104—138 |
| 3,196,577 | 7/1965 | Davidsen et al. | 35—12 |
| 3,209,468 | 10/1965 | Frisch | 35—12 |
| 3,213,802 | 10/1965 | Foa | 104—138 |
| 3,221,419 | 12/1965 | Cohen | 35—12 |

EUGENE R. CAPOZIO, *Primary Examiner.*

R. WEIG, *Assistant Examiner.*